United States Patent
Kinoshita

(10) Patent No.: US 9,341,244 B2
(45) Date of Patent: May 17, 2016

(54) DIAGNOSTIC DEVICE FOR SHIFT CONTROL ACTUATOR

(71) Applicant: Fuji Jukogyo Kabushiki Kaisha, Tokyo (JP)

(72) Inventor: Takahiro Kinoshita, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 14/197,067

(22) Filed: Mar. 4, 2014

(65) Prior Publication Data

US 2014/0274505 A1  Sep. 18, 2014

(30) Foreign Application Priority Data

Mar. 12, 2013 (JP) ................. 2013-049140

(51) Int. Cl.
| | |
|---|---|
| *F16H 9/16* | (2006.01) |
| *F16H 61/12* | (2010.01) |
| *F16H 61/662* | (2006.01) |
| *F16H 59/70* | (2006.01) |
| *F16H 61/66* | (2006.01) |
| *F16H 7/08* | (2006.01) |

(52) U.S. Cl.
CPC ................. *F16H 9/16* (2013.01); *F16H 61/12* (2013.01); *F16H 61/66* (2013.01); *F16H 61/662* (2013.01); *F16H 2007/0876* (2013.01); *F16H 2059/704* (2013.01); *F16H 2061/1208* (2013.01); *F16H 2061/1288* (2013.01)

(58) Field of Classification Search
None
See application file for complete search history.

(56) References Cited

U.S. PATENT DOCUMENTS

| | | | | |
|---|---|---|---|---|
| 4,698,764 A | * | 10/1987 | Inagaki et al. ................. | 701/62 |
| 2009/0204285 A1 | * | 8/2009 | Matsui et al. .................. | 701/29 |
| 2009/0264231 A1 | * | 10/2009 | Ogata et al. .................... | 474/11 |

FOREIGN PATENT DOCUMENTS

| | | |
|---|---|---|
| JP | 2006-248371 A | 9/2006 |
| JP | 2006248371 A * | 9/2006 |

* cited by examiner

*Primary Examiner* — Ramya Burgess
*Assistant Examiner* — Timothy M Hannon
(74) *Attorney, Agent, or Firm* — McGinn IP Law Group PLLC

(57) ABSTRACT

A diagnostic device for a shift control actuator of a CVT includes: a variator; a chamber that is filled with and discharges hydraulic fluid for an upshift and a downshift, respectively; an upshift control valve for filling hydraulic fluid into the chamber; a downshift control valve for discharging hydraulic fluid from the chamber; a fail-safe valve for suspending the discharge of hydraulic fluid from the chamber when the upshift control valve is in a filling state; actuators for driving the upshift and downshift control valves; and a shift controller for controlling the actuators so that an actual shift ratio approaches a target ratio. The shift controller determines the state of the actuators with the information on the actual shift ratio when the controller instructs a downshift or an upshift.

10 Claims, 7 Drawing Sheets

US 9,341,244 B2

DIAGNOSTIC DEVICE FOR SHIFT CONTROL ACTUATOR

CROSS-REFERENCE TO RELATED APPLICATION(S)

The present application claims priority from Japanese Patent Application No. 2013-049140 filed on Mar. 12, 2013, the entire contents of which are hereby incorporated by reference.

TECHNICAL FIELD

The present disclosure relates to a diagnostic device for a shift control actuator of a continuously variable transmission (CVT) provided to a vehicle such as an automobile, and more particularly to the diagnostic device capable of appropriately determining an ON-keeping state of an upshift control actuator or a downshift control actuator.

BACKGROUND OF THE INVENTION

Continuously variable transmissions (CVTs), which are mounted on vehicles such as automobiles and change a shift ratio of a rotational output of, for example, an engine, are provided with a variator (shift mechanism) which can steplessly change the shift ratio by a hydraulic control. In a known example of such a variator, a power shift member, such as a chain or a metal belt, is bridged between a primary pulley (drive-side pulley) and a secondary pulley (driven-side pulley) of which rotational shafts are in parallel with each other, and changes the shift ratio by hydraulically changing an effective diameter of each pulley. In such a variator, for example, it has been known that the variator is configured to perform an upshift by filling a chamber provided in the primary pulley with hydraulic fluid and perform a downshift by discharging the hydraulic fluid from the chamber, and to be provided with an upshift control valve for switching a filling state of the hydraulic fluid to the chamber and a downshift control valve for switching a discharging state of the hydraulic fluid from the chamber. The upshift control valve and the downshift control valve are driven by respective shift control actuators such as solenoids.

Thus, in the continuously variable shift which changes the shift ratio using the actuators for upshifting and downshifting, appropriate diagnoses of normality and abnormality of each actuator is required. As a conventional technique relevant to such a diagnosis of the shift control actuator, for example, Japanese Unexamined Patent Application Publication (JP-A) 2006-248371 discloses that, when an upshift or a downshift of the continuously variable shift is not properly performed, upshift and downshift solenoids are turned on simultaneously, and which solenoid is failed is determined based on transitions of shift ratios at that time.

However, in the above conventional technique, because a particular state where both the upshift and downshift solenoids are turned on must be set after it is first determined that the shift control is not properly performed, the accomplishment to diagnose a failure takes a long period of time. Further, for example, in the case where the downshift solenoid becomes in an ON-keeping state, the hydraulic fluid is discharged at a maximum speed when the upshift solenoid is turned off. However, when the shift ratio becomes higher than a target shift ratio, the upshift solenoid is turned on by a feedback control and, thus, it is possible to fill the hydraulic fluid to the chamber. For this reason, hunching in which an overshoot is repeated occurs, but the feedback control itself which brings an actual shift ratio close to the target shift ratio is still possible, whereby the failure determination may not be performed.

SUMMARY OF THE INVENTION

The present disclosure is made in view of the above situations, and provides a diagnostic device for a shift control actuator, which can appropriately determine an ON-keeping state of an upshift control actuator or a downshift control actuator.

An aspect of the present disclosure provides a diagnostic device for a shift control actuator of a continuously variable transmission, the diagnostic device including: a variator; a chamber; an upshift control valve; a downshift control valve; a fail-safe valve; an upshift control actuator; a downshift control actuator; an actual shift ratio detector; and a shift controller. The variator steplessly changes a shift ratio from a predetermined maximum shift ratio to a predetermined minimum shift ratio. The chamber decreases the shift ratio of the variator by being filled with hydraulic fluid, and increases the shift ratio of the variator by discharging the hydraulic fluid. The upshift control valve switches between a filling state where the hydraulic fluid supplied from an oil pump is filled into the chamber and a non-filling state where the filling of the hydraulic fluid into the chamber is suspended. The downshift control valve switches between a discharging state where the hydraulic fluid is discharged from the chamber and a non-discharging state where the discharge of the hydraulic fluid from the chamber is suspended. The fail-safe valve suspends the discharge of the hydraulic fluid from the chamber when the upshift control valve is in the filling state regardless of the state of the downshift control valve, and permits the downshift control valve to discharge the hydraulic fluid when the upshift control valve is in the non-filling state. The upshift control actuator drives the upshift control valve to switch between the filling state and the non-filling state. The downshift control actuator drives the downshift control valve to switch between the discharging state and the non-discharging state. The actual shift ratio detector detects an actual shift ratio of the variator. The shift controller controls the upshift control actuator and the downshift control actuator so that the actual shift ratio approaches a target shift ratio. When the shift controller instructs the downshift control actuator so that the downshift control valve becomes in the discharging state, and a state where the actual shift ratio is substantially kept at the minimum shift ratio continues for a predetermined period of time or more, the shift controller determines that the upshift control actuator is kept in the filling state. Note that the term "shift ratio" as used herein and in the claims defines a ratio of an output rotation speed of the variator with respect to an input rotational speed of the variator (a speed-reduction ratio). Further, note that the term "downshift" as used herein and in the claims defines an increasing change in the shift ratio, and the term "upshift" as used herein and in the claims defines a deceasing change in the shift ratio .

When the transmission controller instructs the upshift control actuator so that the upshift control valve becomes in the filling state, and an event where the actual shift ratio increases is detected a predetermined number of times or more, the shift controller may determine that the downshift control actuator is kept in the discharging state.

Another aspect of the present disclosure provides a diagnostic device for a shift control actuator of a continuously variable transmission, the diagnostic device including: a variator; a chamber; an upshift control valve; a downshift control valve; a fail-safe valve; an upshift control actuator; a downshift control actuator; an actual shift ratio detector; and a shift controller. The variator steplessly changes a shift ratio from a predetermined maximum shift ratio to a predetermined minimum shift ratio. The chamber decreases the shift ratio of the variator by being filled with hydraulic fluid, and increases the shift ratio of the variator by discharging the hydraulic fluid. The upshift control valve switches between a filling state where the hydraulic fluid supplied from an oil pump is filled into the chamber and a non-filling state where the filling of the hydraulic fluid into the chamber is suspended. The downshift control valve switches between a discharging state where the hydraulic fluid is discharged from the chamber and a non-discharging state where the discharge of the hydraulic fluid from the chamber is suspended. The fail-safe valve suspends the discharge of the hydraulic fluid from the chamber when the upshift control valve is in the filling state regardless of the state of the downshift control valve, and permits the discharge of the hydraulic fluid by the downshift control valve when the upshift control valve is in the non-filling state. The upshift control actuator drives the upshift control valve to switch between the filling state and the non-filling state. The downshift control actuator drives the downshift control valve to switch between the discharging state and the non-discharging state. The actual shift ratio detector detects an actual shift ratio of the variator. The shift controller controls the upshift control actuator and the downshift control actuator so that the actual shift ratio approaches the target shift ratio. When the shift controller instructs the upshift control actuator so that the upshift control valve becomes in the filling state, and the event where the actual shift ratio increases is detected a predetermined number of times or more, the shift controller determines that the downshift control actuator is kept in the discharging state.

The downshift control actuator may have a function to change steplessly or in a plurality of steps a discharging speed of the hydraulic fluid from the chamber according to an increase in a controlled variable thereof. The shift controller may determine that the upshift control actuator is kept in the filling state, only when the controlled variable of the downshift control actuator is a predetermined value or above.

The upshift control actuator may have a function to change steplessly or in a plurality of steps a filling speed of the hydraulic fluid to the chamber according to an increase in a controlled variable thereof. The shift controller may determine that the downshift control is kept in the discharging state, only when the controlled variable of the upshift control actuator is a predetermined value or above.

BRIEF DESCRIPTION OF DRAWINGS

The present disclosure is illustrated by way of example and not by way of limitation in the figures of the accompanying drawings, in which the like reference numerals indicate like elements and in which.

DETAILED DESCRIPTION

A diagnostic device for a shift control actuator according to the present disclosure is able to appropriately determine an ON-keeping state of an upshift control actuator or a downshift control actuator. The diagnostic device determines the ON-keeping state of the upshift control solenoid when a shift ratio is kept at a minimum shift ratio (overdrive:OD) even though a downshift control solenoid is ON. The diagnostic device also determines an OFF-keeping state of the downshift control solenoid when an event of increasing the shift ratio (downshift) occurs a predetermined number of times or more even though the upshift control solenoid is ON.

[Implementation]

Hereinafter, an implementation of the diagnostic device for a shift control actuator (hereinafter, referred to as "the diagnostic device") according to the present disclosure is described. The diagnostic device of this implementation diagnoses an ON-keeping state failure of an upshift control actuator 141 and a downshift control actuator 151 of a continuously variable transmission (CVT) mounted on a vehicle, such as an automobile.

Figure 1:
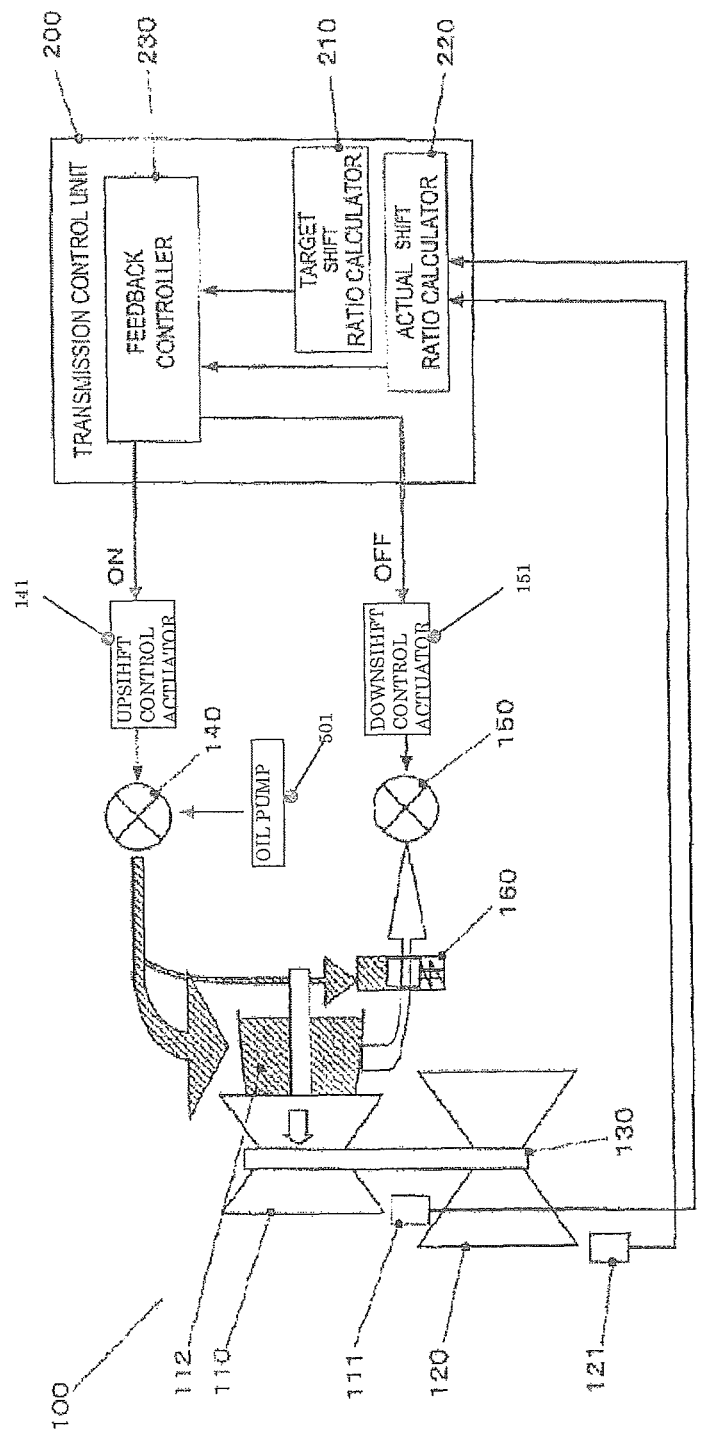
FIG. 1 is a schematic diagram illustrating a configuration of a diagnostic device for a shift control actuator and a continuously variable transmission according to an implementation of the present disclosure, and illustrating an upshifting state in a normal condition.
Figure 2:
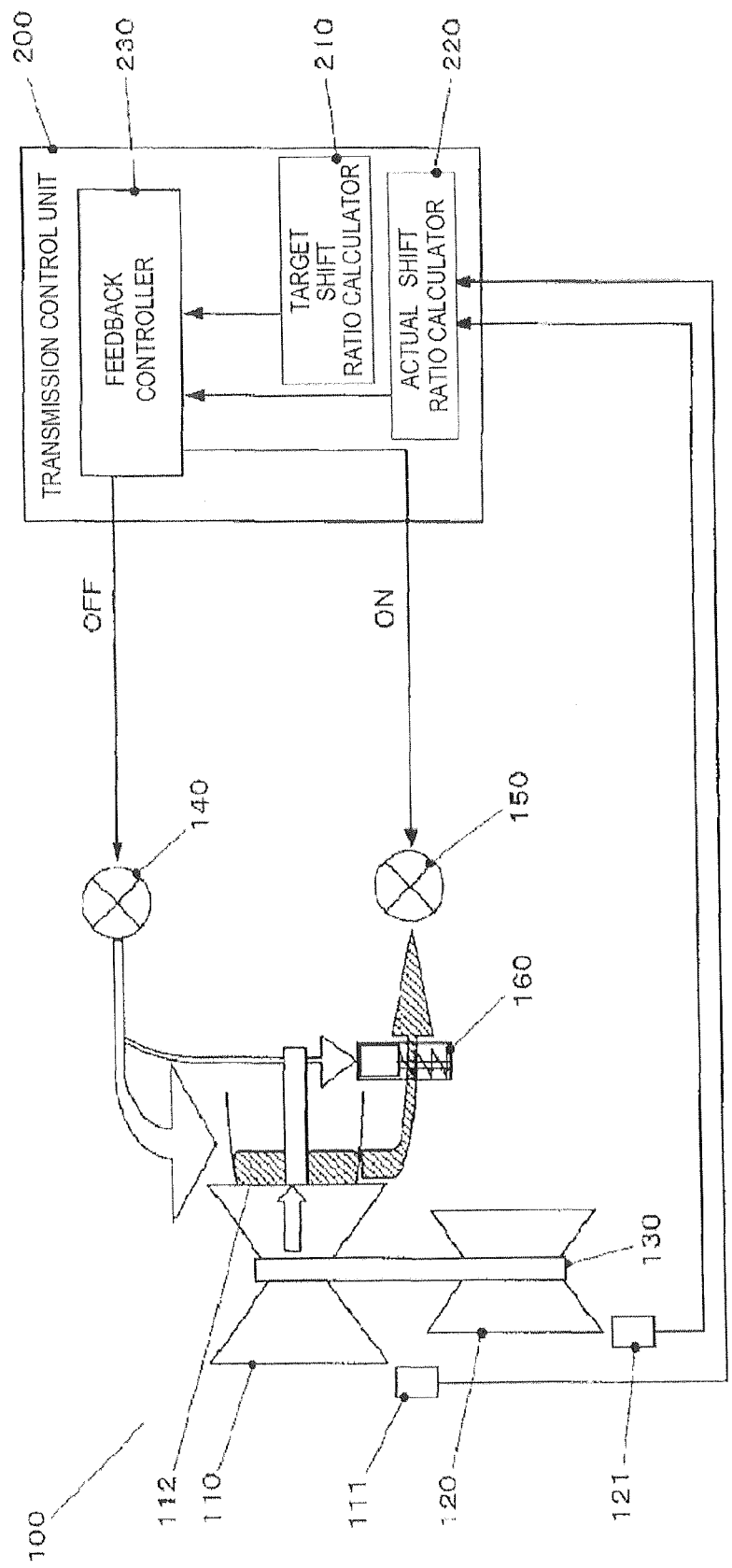
FIG. 2 is a schematic diagram illustrating the configuration of the diagnostic device for a shift control actuator and the continuously variable transmission according to the implementation of the present disclosure, and illustrating a downshifting state in the normal condition.

FIG. 1 is a schematic diagram illustrating a configuration of the diagnostic device and the continuously variable transmission of this implementation, and illustrating an upshifting state in a normal condition. FIG. 2 is a schematic diagram illustrating the configuration of the diagnostic device and the continuously variable transmission of this implementation, and illustrating a downshifting state in the normal condition.

The continuously variable transmission 100 includes a primary pulley 110, a secondary pulley 120, a chain 130, an upshift control valve 140, a downshift control valve 150, a fail-safe valve 160, and a transmission control unit 200.

The primary pulley 110 is a rotary body and receives a rotational output from an engine of the vehicle. The primary pulley 110 is constructed so that a pair of conical sheaves which pinch the chain 130 therebetween are opposed to each other. The primary pulley 110 can change the effective diameter at which the chain 130 is wound by approaching or separating the sheaves to/from each other in an axial direction. A rotation sensor 111 for detecting a revolving speed is provided to the primary pulley 110.

A chamber 112 is provided to the primary pulley 110. The chamber 112 is with hydraulic fluid to reduce an interval between the sheaves of the primary pulley 110, thereby increasing the effective diameter (upshift). On the other hand, The hydraulic fluid from the chamber 112 is discharged to increase the sheave interval, thereby decreasing the effective diameter (downshift).

The secondary pulley 120 is a rotary body connected to driving wheels of the vehicle via a power shift mechanism, such as a final drive, and rotates about a rotational axis parallel to the primary pulley 110. The secondary pulley 120 is constructed so that a pair of conical sheaves which pinch the chain 130 therebetween are opposed to each other. The secondary pulley 120 can change the effective diameter at which the chain 130 is wound by approaching or separating the sheaves to/from each other in an axial direction. The secondary pulley 120 cooperatively reduces its effective diameter with an increase in the effective diameter of the primary pulley 110, cooperatively increases its effective diameter with a decrease in the effective diameter of the primary pulley 110. A rotation sensor 121 for detecting a revolving speed is provided to the secondary pulley 120.

The chain 130 is wound around the primary pulley 110 and the secondary pulley 120 to transmit power between these pulleys. The primary pulley 110, the secondary pulley 120, and the chain 130 cooperate together to constitute a variator (shift mechanism) of the continuously variable transmission 100 which can steplessly change a shift ratio.

After an oil pump 501 pressurizes and discharges hydraulic fluid, the upshift control valve 140 switches between filling and cutoff of the hydraulic fluid to the chamber 112, where the hydraulic fluid is regulated at a predetermined secondary pressure by a hydraulic regulator. The upshift control valve 140 is driven with an upshift control solenoid (not illustrated). The upshift control solenoid is turning on to fill the chamber 112 with the hydraulic fluid, and, on the other hand, the upshift control solenoid is turned off to suspend the filling of the hydraulic fluid to the chamber 112. The upshift control solenoid substantially steplessly increases a filling speed of the hydraulic fluid according to an increase in the duty ratio of driving current (0 to 100%).

A down shifting control valve 150 switches between discharge (drain) and cutoff of the hydraulic fluid inside the chamber 112. The down shifting control valve 150 is driven by a downshift control solenoid (not illustrated). The downshift control solenoid is turned on to discharge the hydraulic fluid from the chamber 112. On the other hand, the downshift control solenoid is turned off to suspend the discharge of the hydraulic fluid from the chamber 112. The down shifting control solenoid substantially steplessly increases the discharging speed of the hydraulic fluid according to an increase in the duty ratio of driving current (0 to 100%).

A fail-safe valve 160 is provided to a discharge oil passage of the hydraulic fluid which extends from the primary pulley 112 to the downshift control valve 150. The fail-safe valve 160 blocks the discharge line of the hydraulic fluid to suspend the discharge of the hydraulic fluid regardless of a state of the downshift control valve 150, when the upshift control valve 140 is in an opened state (filling state) and the duty ratio of the upshift control actuator is above the predetermined value. On the other hand, when the upshift control valve 140 is in a closed state (filling suspended state), the fail-safe valve 160 becomes in an opened state by a biasing force of a spring, and, in this state, the downshift control valve 150 is opened to discharge the hydraulic fluid from the chamber 112.

The transmission control unit 200 comprehensively controls the continuously variable transmission 100 and its accessories. The transmission control unit 200 includes an information processor such as a CPU, a memory such as a RAM and a ROM, an input/output interface, and a bus connecting these components.

The transmission control unit 200 also includes a target shift ratio calculator 210, an actual shift ratio calculator 220, a feedback controller 230, the upshift control actuator 141, and the downshift control actuator 151. The target shift ratio calculator 210 calculates a target shift ratio of the continuously variable shift 100 with a shift ratio diagram defined in advance, based on a traveling state of the vehicle and/or a driving torque requested from an operator of the vehicle. The actual shift ratio calculator 220 calculates an actual shift ratio of the continuously variable shift 100 (actual shift ratio=secondary pulley revolving speed / primary pulley revolving speed) based on the revolving speed of the primary pulley 110 detected by the rotation sensor 111, and the revolving speed of the secondary pulley 120 detected by the rotation sensor 121. The feedback controller 230 performs a feedback control of the upshift control solenoid and the downshift control solenoid based on a difference between the target shift ratio calculated by the target shift ratio calculator 210 and the actual shift ratio calculated by the actual shift ratio calculator 220 so that the actual shift ratio approaches the target shift ratio.

As illustrated in FIG. 1, when the actual shift ratio is higher than the target shift ratio, the feedback controller 230 issues an ON instruction to the upshift control solenoid, while issuing an OFF instruction to the downshift control solenoid. The feedback controller 230 sets the duty ratio of the upshift control solenoid higher, when the difference between the target shift ratio and the actual shift ratio is large, and thus a rapid change in the shift ratio is required. Accordingly, the upshift control valve 140 is opened, and the chamber 112 is filled with the hydraulic fluid. Further, the down shifting control valve 150 and the fail-safe valve 160 are closed and, thus, the hydraulic fluid will not be discharged from the chamber 112. As a result, the effective diameter of the primary pulley 110 increases, while the effective diameter of the secondary pulley 120 decreases, whereby the shift ratio of the continuously variable transmission 100 is lowered (upshift).

As illustrated in FIG. 2, when the actual shift ratio is lower than the target shift ratio, the feedback controller 230 issues an OFF instruction to the upshift control solenoid, while issuing an ON instruction to the downshift control solenoid. The feedback controller 230 sets the duty ratio of the downshift control solenoid higher, when the difference between the target shift ratio and the actual shift ratio is large and thus a rapid change in the shift ratio is required. At this time, the upshift control valve 140 is closed, the fail-safe valve 160 is opened, the downshift control valve 150 is opened, and the hydraulic fluid inside the chamber 112 is discharged at a speed according to the duty ratio of the downshift control solenoid. As a result, the effective diameter of the primary pulley 110 decreases, while the effective diameter of the secondary pulley 120 increases, whereby the shift ratio of the continuously variable transmission 100 increases (downshift).

The transmission control unit 200 also functions as a diagnostic device for diagnosing failures of the upshift control solenoid and the downshift control solenoid in the continuously variable transmission 100. When the transmission control unit 200 instructs a duty ratio above the predetermined value to the upshift control solenoid but an upshift is not performed, the transmission control unit 200 determines the OFF-keeping state of the upshift control solenoid. On the other hand, when the transmission control unit 200 instructs the duty ratio above the predetermined value to the downshift control solenoid but a downshift is not performed, the transmission control unit 200 determines the OFF-keeping state of the downshift control solenoid. In addition, the transmission control unit 200 diagnoses the ON-keeping states of the upshift control solenoid and the downshift control solenoid (kept in an energizing state even though they are not supplied with any current), as described below.

Figure 3:
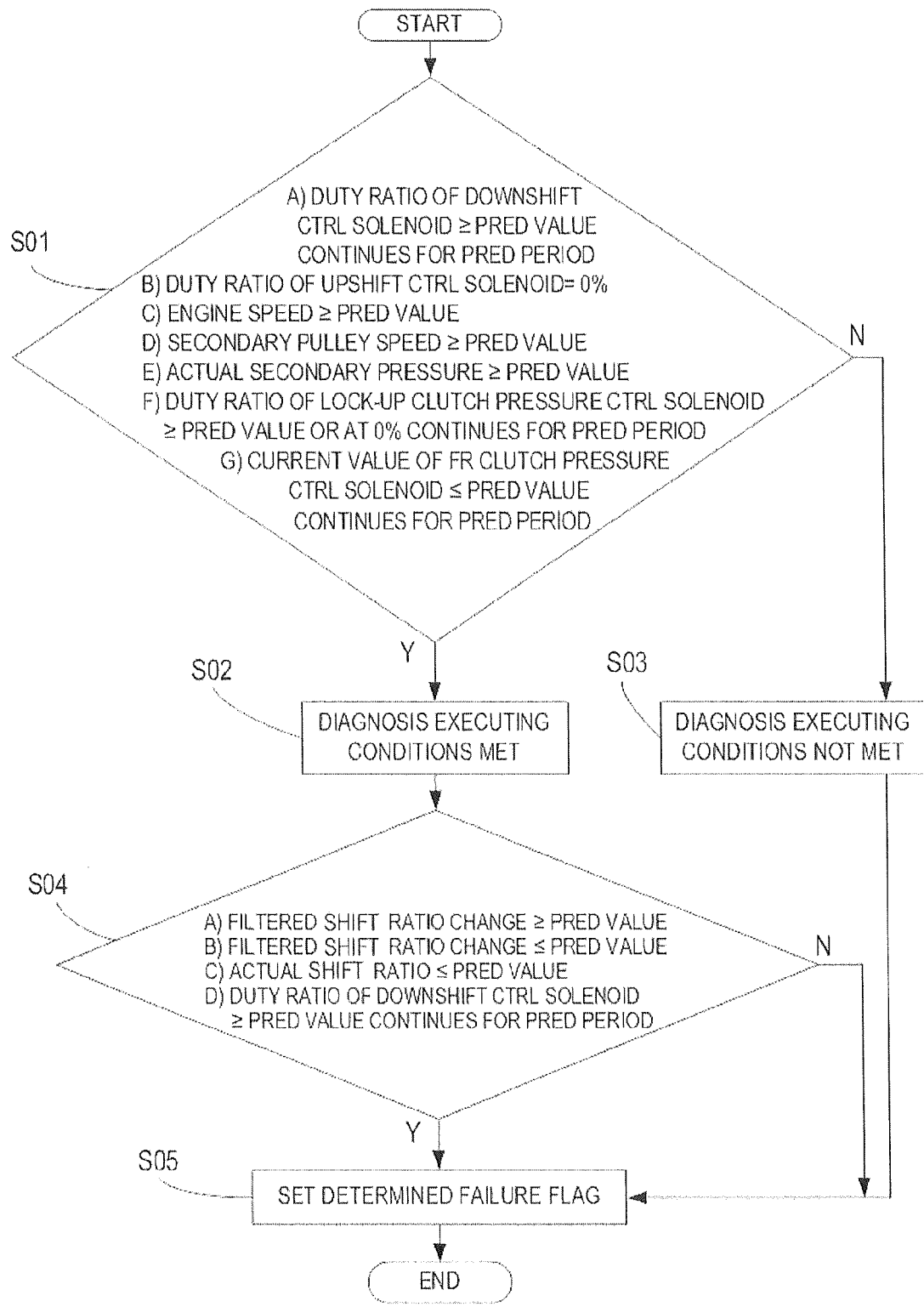
FIG. 3 is a flowchart illustrating an ON-keeping state diagnosis of an upshift control solenoid in the diagnostic device for a shift control actuator according to the implementation.

FIG. 3 is a flowchart illustrating an upshift control solenoid ON-keeping state diagnosis in the diagnostic device of this implementation. Hereinafter, the diagnosis is described sequentially step by step.

Step S01: Diagnosis Executing Condition Determination

The transmission control unit 200 determines whether all conditions described below are met. When all the conditions are met, the transmission control unit 200 proceeds to Step S02, and when at least one of the conditions is not met, the transmission control unit 200 proceeds to Step S03. These conditions are set on the ground that the diagnosis is not performed in a state where an operating condition of the transmission is in transition, so as to prevent erroneous diagnoses. The conditions are specifically as follows:

a) A state where the duty ratio of the downshift control solenoid is above a predetermined value (for example, 30%) continues for a predetermined period of time (for example, 0.1 sec) or more.
b) The duty ratio of the upshift control solenoid is 0%.
c) The engine speed is a predetermined value (for example, 1000 rpm) or above.
d) The revolving speed of the secondary pulley is a predetermined value (for example, 500 rpm) or above.
e) An actual secondary pressure is a predetermined value (for example, 0.6 MPa) or above.
f) A state where the duty ratio of a lock-up clutch pressure control solenoid is above a predetermined value (for example, 90%) or at 0% continues for a predetermined period of time (for example, 0.1 sec) or more.
g) A state where the current value of an FR clutch pressure control solenoid is a predetermined value (for example, 0.7 A) or below continues for a predetermined period of time (for example, 0.1 sec) or more.

Step S02: Diagnosis Executing Conditions are Met

The transmission control unit 200 proceeds to Step S04 concluding that the executing conditions of the ON-keeping state diagnosis of the upshift control solenoid are met.

Step S03: Diagnosis Executing Conditions are not Met

The transmission control unit 200 terminates the series of processes (return), concluding that the executing conditions of the ON-keeping state diagnosis of the upshift control solenoid are not met.

Step S04: Diagnosis Conditions Determination

The transmission control unit 200 determines whether all the conditions described below are met. When all the conditions are met, the transmission control unit 200 proceeds to Step S05, and when at least one of the conditions is not met, the series of processes are terminated (return).

a) A change in a filtered shift ratio is a predetermined value (for example, −0.05 [1/S]) or above.

b) The change in the filtered shift ratio is a predetermined value (for example, 0.05 [1/S]) or below.

Note that the filter herein is a low pass filter aiming at a noise removal, and the change in the filtered shift ratio can be calculated, for example, with the Equation 1. The above conditions a) and b) mean that the shift ratio has not substantially be changed.

Change in filtered shift ratio [n]=predetermined value (0.01)×change in shift ratio [n]+(1−predetermined value (0.01))×change in shift ratio [n−1]  (Equation 1)

c) The actual shift ratio is a predetermined value (for example, 0.5) or below.

The predetermined value is set to a substantially same vale as the minimum shift ratio (OD shift ratio) of the continuously variable transmission 100.

d) A state where the duty ratio of the downshift control solenoid is above a predetermined value (for example, 80%) continues for a predetermined period of time (for example, 0.1 sec) or more.

Step S05: Setting Determined Failure Flag

The transmission control unit 200 sets an ON-keeping state determined failure flag of the upshift control solenoid, and terminates the series of processes (return).

Figure 4:
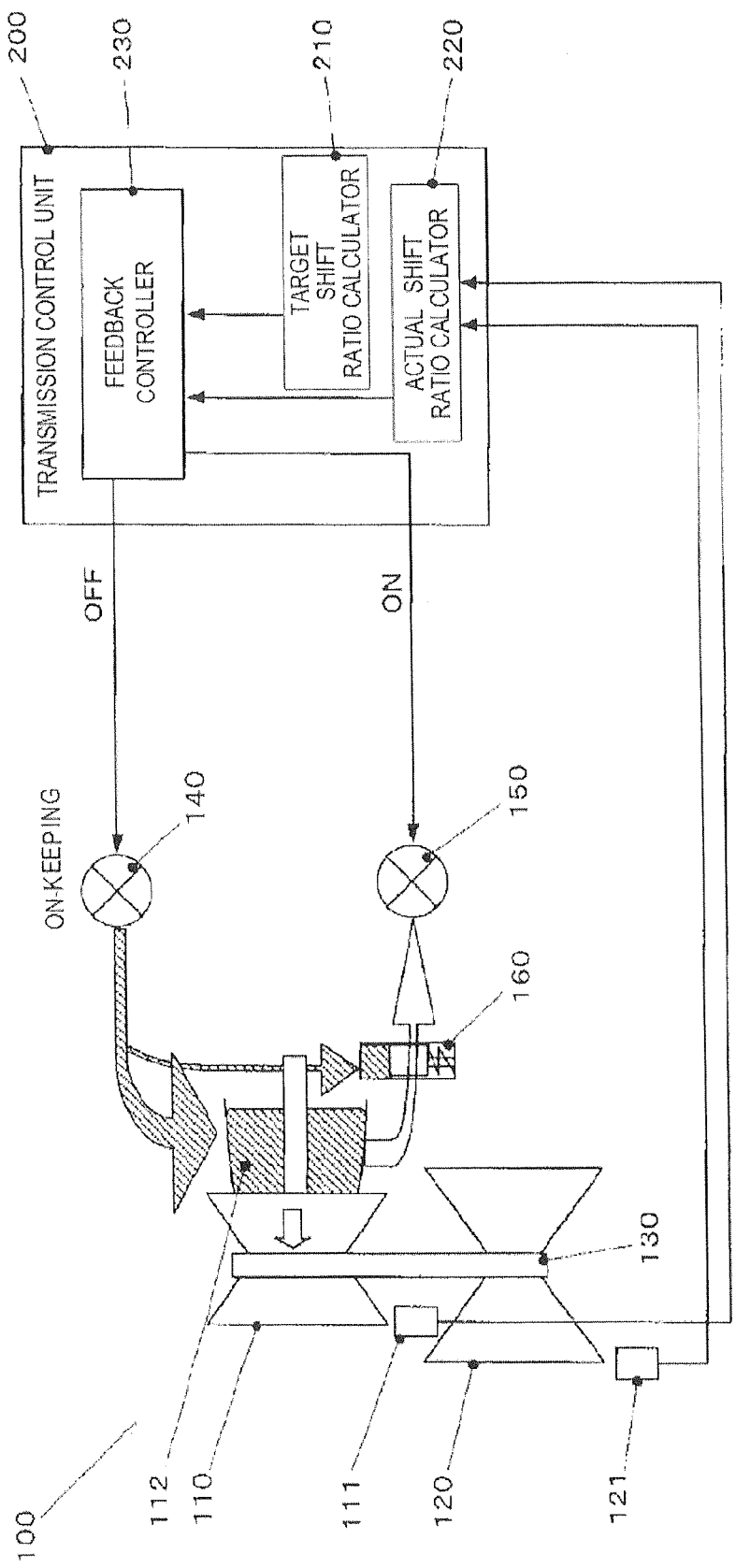
FIG. 4 is a schematic diagram illustrating the configuration of the diagnostic device for a shift control actuator and the continuously variable transmission according to the implementation of the present disclosure, and illustrating an ON-keeping state of the upshift control solenoid.

FIG. 4 is a schematic diagram illustrating a configuration of the diagnostic device and the continuously variable transmission of this implementation, and illustrating the ON-keeping state of the upshift control solenoid. As illustrated in FIG. 4, if the transmission control unit 200 issues the ON instruction to the downshift control solenoid and the OFF instruction to the upshift control solenoid in order to perform a downshift, but the upshift control solenoid is in the ON-keeping state, the chamber 112 is continuously filled with the hydraulic fluid, as well as the fail-safe valve 160 is closed, thereby suspending the discharge of the hydraulic fluid from the chamber 112. As a result, the shift ratio of the continuously variable transmission 100 is substantially kept at the minimum shift ratio. Thus, as described above, a failure is diagnosed when the duty ratio of the downshift control solenoid is the predetermined value or above but the state where the filtered shift ratio is not substantially changed is kept for the predetermined period of time or, whereby the ON-keeping state of the upshift control solenoid can be appropriately determined.

Figure 5:
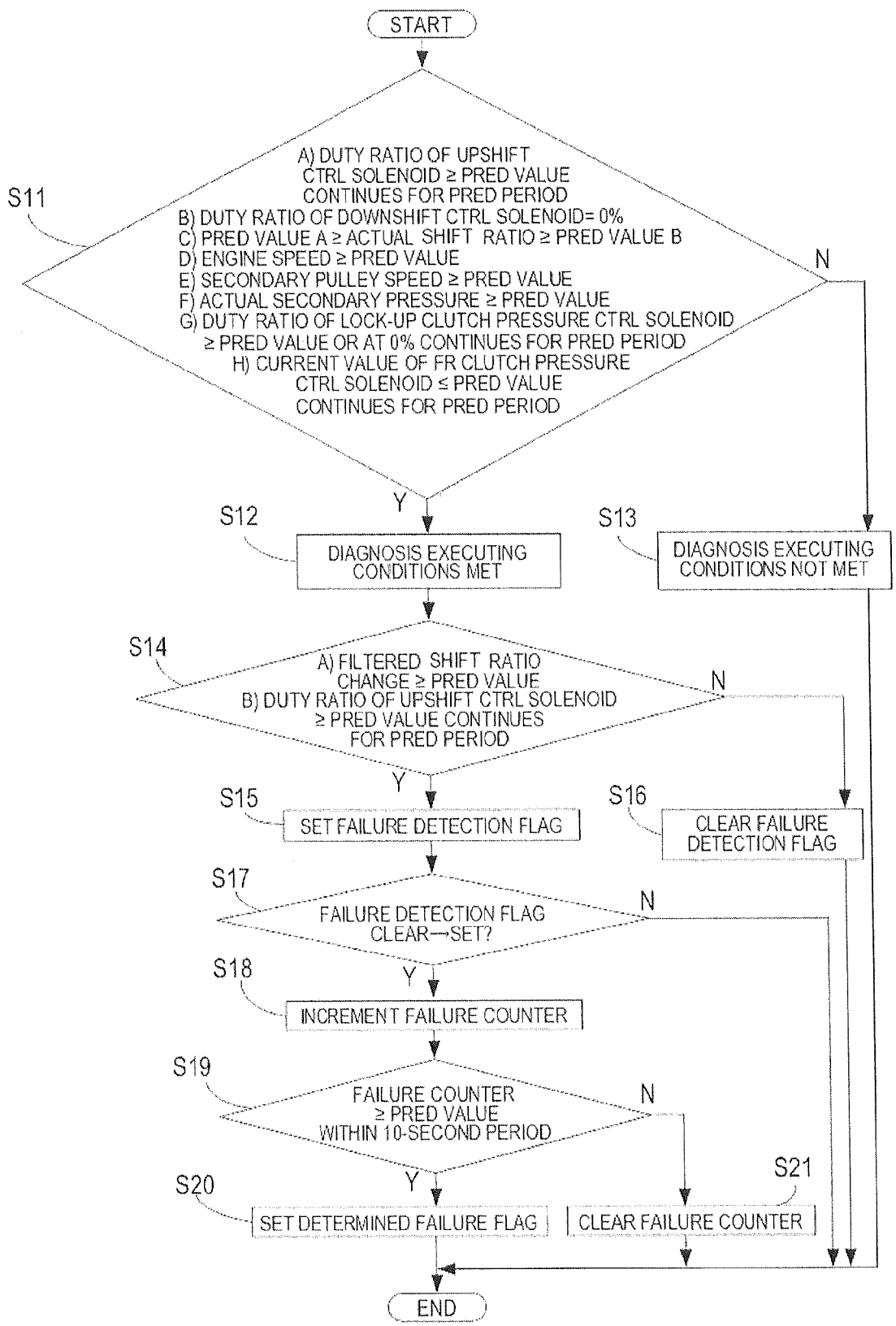
FIG. 5 is a flowchart illustrating an ON-keeping state diagnosis of a downshift control solenoid in the diagnostic device for a shift control actuator according to the implementation of the present disclosure.

FIG. 5 is a flowchart illustrating a downshift control solenoid ON-keeping state diagnosis in the diagnostic device of this implementation. Hereinafter, the diagnosis is sequentially described step by step.

Step S11: Diagnosis Executing Conditions Determination

The transmission control unit 200 determines whether all the conditions described below are met. When all the conditions are met, the transmission control unit 200 proceeds to Step S12, and, on the other hand, when at least one of the conditions is not met, the transmission control unit 200 proceeds to Step S13. These conditions are set on the ground that the diagnosis is not performed in a state where an operating condition of the transmission is in transition, so as to prevent erroneous diagnoses. The conditions are specifically as follows:

a) A state where the duty ratio of the upshift control solenoid is a predetermined value (for example, 10%) or above continues for a predetermined period of time (for example, 0.1 sec) or more.

b) The duty ratio of the downshift control solenoid is 0%.
c) The actual shift ratio is within a predetermined range (intermediate shift ratio) where control hunching may occur (for example, from 0.5 to 2.3).
d) The engine speed is a predetermined value (for example, 1000 rpm) or above.
e) The revolving speed of the secondary pulley is a predetermined value (for example, 500 rpm) or above.
f) The actual secondary pressure is a predetermined value (for example, 0.6 MPa) or above.
g) A state where the duty ratio of the lock-up clutch pressure control solenoid is above a predetermined value (for example, 90%) or above or at 0% continues for a predetermined period of time (for example, 0.1 sec) or more.
h) A state where the current value of the FR clutch pressure control solenoid is a predetermined value (for example, 0.7 A) or below continues for a predetermined period of time (for example, 0.1 sec) or more.

Step S12: Diagnosis Executing Conditions are Met

The transmission control unit 200 proceeds to Step S14 concluding that the executing conditions of the ON-keeping state diagnosis of the downshift control solenoid are met.

Step S13: Diagnosis Executing Conditions are not Met

The transmission control unit 200 terminates the series of processes (return), concluding that the executing conditions of the ON-keeping state diagnosis of the downshift control solenoid are not met.

Step S14: Failure Detection Determination

The transmission control unit 200 determines whether all conditions described below are met. When all the conditions are met, the transmission control unit 200 proceeds to Step S15, and, on the other hand, when at least one of the conditions is not met, the transmission control unit 200 proceeds to Step S16.
a) The change in the filtered shift ratio is a predetermined value (for example, 0.05 [1/S]) or above. Here, the change in the filtered shift ratio is same as the change described in the above Equation 1.
b) A state where the duty ratio of the upshift control solenoid is a predetermined value (for example, 50%) or above continues for a predetermined period of time (for example, 0.1 sec) or more.

Step S15: Setting Failure Detection Flag

The transmission control unit 200 sets a failure detection flag, and then proceeds to Step S17.

Step S16: Clearing Failure Detection Flag

The transmission control unit 200 clears the failure detection flag, and then terminates the series of processes (return).

Step S17: Determination of Change in Failure Detection Flag

The transmission control unit 200 proceeds to Step S18 when the failure detection flag changes from a flag cleared state to a flag set state in the previous Step S15. On the other hand, the transmission control unit 200 terminates the series of processes (return) when the failure detection flag has been in the set state prior to the previous Step S15 and the failure detection flag remains unchanged in the set state.

Step S18: Incrementing Failure Counter

The transmission control unit 200 increments a counter value of a failure counter for counting the number of changes the failure detection flag changed from the cleared state to the set state in Step S17. Then, the transmission control unit 200 proceeds to Step S19.

Step S19: Determination of Failure Counter Value

The transmission control unit 200 determines whether the counter value of the failure counter reaches a predetermined value (for example, 10 times) or more within a 10-second period. When the counter value is the predetermined value or more, the transmission control unit 200 proceeds to Step S20, and, on the other hand, when it is below a predetermined value, the transmission control unit 200 proceeds to Step S21.

Step S20: Setting Determined Failure Flag

The transmission control unit 200 sets the ON-keeping state determined failure flag of the downshift control solenoid, and then terminates the series of processes (return).

Step S21: Clearing Failure Counter

The transmission control unit 200 clears the counter value of the failure counter, and then terminates the series of processes (return).

Figure 6:
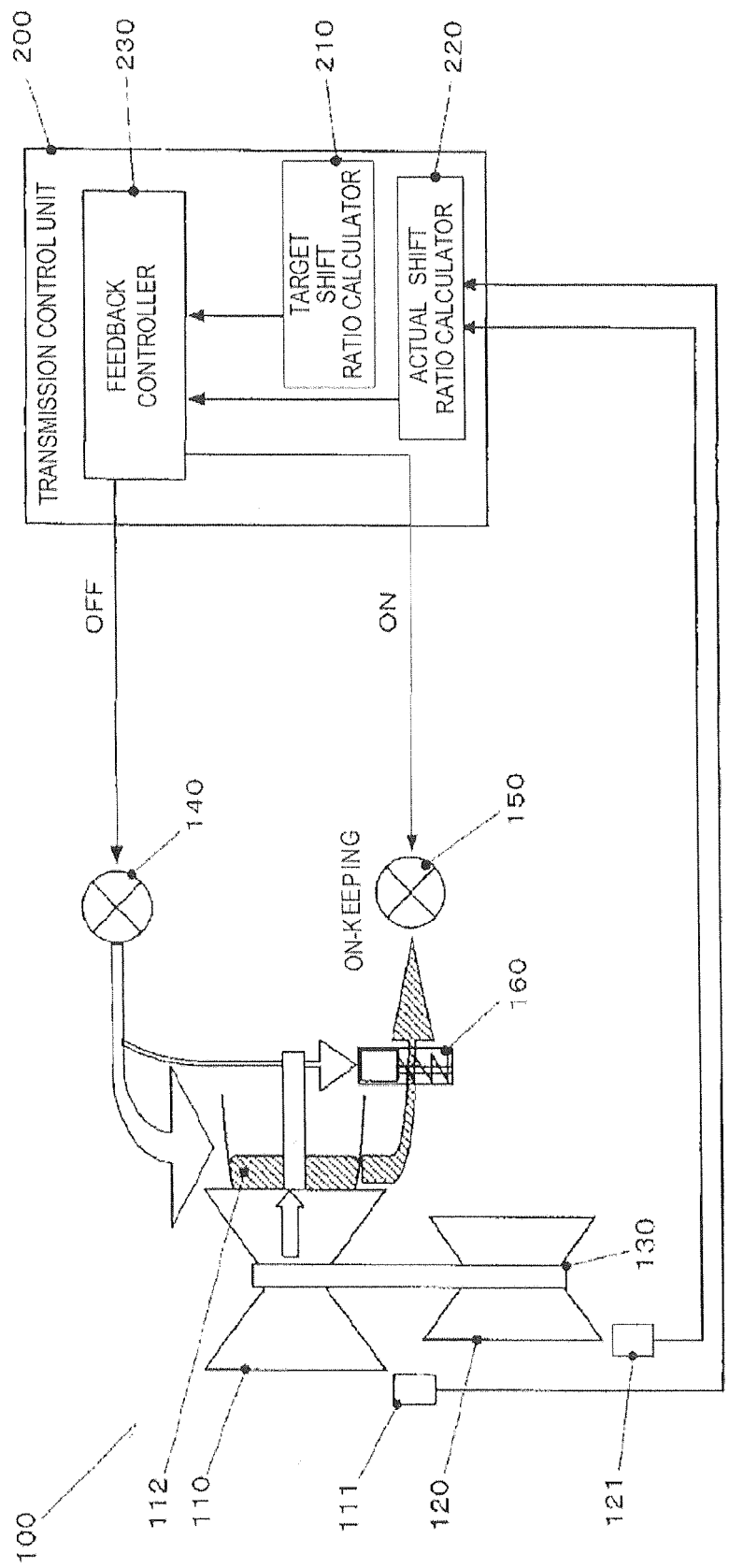
FIG. 6 is a schematic diagram illustrating the configuration of the diagnostic device for a shift control actuator and the continuously variable transmission according to the implementation of the present disclosure, and illustrating a state where a shift control unit instructs a downshift at the time of an ON-keeping state of a downshift control solenoid.

FIG. 6 is a schematic diagram illustrating the configuration of the diagnostic device and the continuously variable transmission of this implementation, and illustrating a state where the transmission control unit instructs a downshift at the time of the ON-keeping state of the downshift control solenoid. As illustrated in FIG. 6, when the transmission control unit 200 issues an ON instruction to the downshift control solenoid and an OFF instruction to the upshift control solenoid in order to perform a downshift, the downshift control valve 150 is in a fully opened state regardless of the duty ratio of the downshift control solenoid, and therefore the hydraulic fluid inside the chamber 112 is discharged with the maximum speed and a downshift is performed at high speed. As a result, an overshoot in which the actual shift ratio of the continuously variable transmission 100 exceeds the target shift ratio occurs. In this case, the transmission control unit 200 instructs an upshift by a feedback control.

Figure 7:
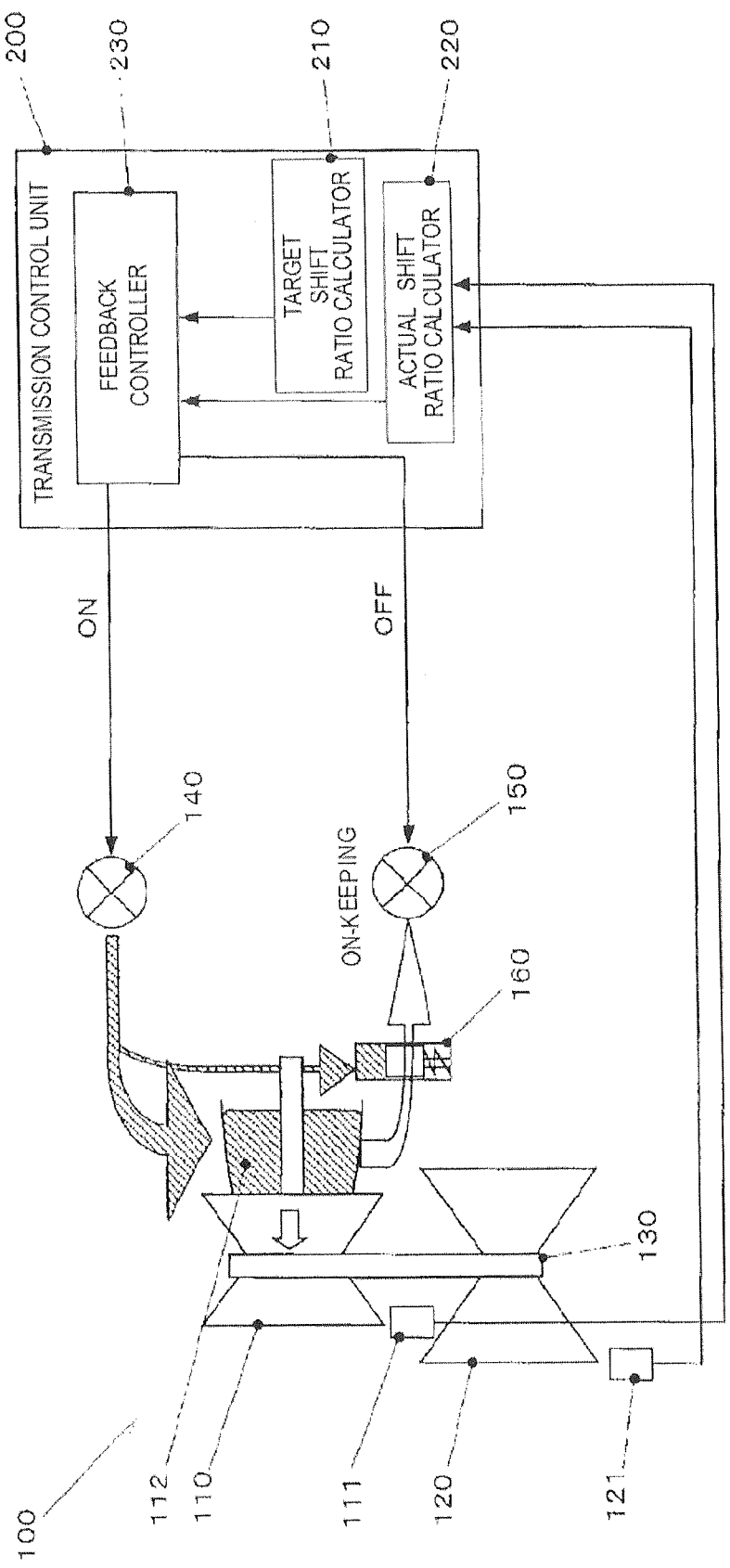
FIG. 7 is a schematic diagram illustrating the configuration of the diagnostic device for a shift control actuator and the continuously variable transmission according to the implementation of the present disclosure, and illustrating a state where the shift control unit instructs an upshift at the time of the ON-keeping state of the downshift control solenoid.

FIG. 7 is a schematic diagram illustrating the configuration of the diagnostic device and the continuously variable transmission of this implementation, and illustrating a state where the transmission control unit 200 instructs an upshift at the time of the ON-keeping state of the downshift control solenoid. As illustrated in FIG. 7, when the shift control unit 200 issues an ON instruction to the upshift control solenoid and an OFF instruction to the downshift control solenoid in order to perform an upshift, the fail-safe valve 160 is closed in conjunction with the opening of the upshift control valve 140. Accordingly, the filling of the hydraulic fluid to the chamber 112 can be properly performed even if the downshift control valve 150 is in a fully opened state.

Then, when the actual shift ratio of the continuously variable transmission 100 is upshifted until it becomes smaller than the target shift ratio, the transmission control unit 200 again instructs a downshift by the feedback control, and then returns to the state illustrated in FIG. 6. After that, the states of FIGS. 6 and 7 are frequently repeated, whereby hunching occurs. Thus, as described above, by diagnosing a failure when the duty ratio of the upshift control solenoid is above the predetermined value but the state where downshifts have occurred a predetermined number of times or more, the ON-keeping state of the downshift control solenoid can be appropriately determined.

As described above, the following effects can be acquired according to this implementation.

(1) The ON-keeping state of the upshift control solenoid can be appropriately determined based on whether the transmission control unit 200 instructs the downshift control solenoid so that the downshift control valve 150 becomes in the discharging state, and a state where the actual shift ratio is substantially kept at the minimum shift ratio continues for a predetermined period of time or more.

(2) The downshift control solenoid can be appropriately determined to be kept in the discharging state based on whether the transmission control unit 200 instructs the upshift control solenoid so that the upshift control valve 140 becomes in the filling state, and an event where the actual shift ratio increases is detected a predetermined number of times or more.

(3) Erroneous determinations can be prevented to improve accuracy of the determination by determining the ON-keeping state of the upshift control solenoid only when the duty ratio of the downshift control solenoid is above the predetermined value, and by determining the ON-keeping state of the downshift control solenoid only when the duty ratio of the upshift control solenoid is above the predetermined value.

MODIFICATIONS

The present disclosure is not limited to the above-described implementation. A variety of modifications and changes can be implemented, which are also within the technical scope of the present invention. For example, the continuously variable transmission of the above implementation is a chain type continuously variable transmission which uses a pair of variable pulleys and a chain as a variator. Alternatively, the present disclosure can also be applied to continuously variable transmissions having a variator of other types, such as a belt type and a toroidal type. Further, the continuously variable transmission of the above implementation uses a solenoid as the shift control actuator. Alternatively, it may also use a stepping motor, for example. The various kinds of numeric parameters are merely examples, and they may be suitably changed.

In the foregoing specification, specific implementations of the present disclosure have been described. However, one of ordinary skill in the technique appreciates that various modifications and changes can be performed without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A diagnostic device for a shift control actuator of a continuously variable transmission, comprising:

a variator for steplessly changing a shift ratio from a predetermined maximum shift ratio to a predetermined minimum shift ratio;

a chamber for decreasing the shift ratio of the variator by being filled with hydraulic fluid, and increasing the shift ratio of the variator by discharging the hydraulic fluid;

an upshift control valve that switches between a filling state where the hydraulic fluid supplied from an oil pump is filled into the chamber and a non-filling state where the filling of the hydraulic fluid into the chamber is suspended, to decrease the shift ratio of the variator;

a downshift control valve that switches between a discharging state where the hydraulic fluid is discharged from the chamber and a non-discharging state where the discharge of the hydraulic fluid from the chamber is suspended, to increase the shift ratio of the variator;

a fail-safe valve for suspending the discharge of the hydraulic fluid from the chamber when the upshift control valve is in the filling state regardless of the state of the downshift control valve, and permitting the downshift control valve to discharge the hydraulic fluid when the upshift control valve is in the non-filling state;

an upshift control actuator for driving the upshift control valve to switch between the filling state and the non-filling state;

a downshift control actuator for driving the downshift control valve to switch between the discharging state and the non-discharging state;

an actual shift ratio detector for detecting an actual shift ratio of the variator; and a shift controller for controlling the upshift control actuator and the downshift control actuator so that the actual shift ratio approaches the target shift ratio, wherein, when the shift controller instructs the downshift control actuator so that the downshift control valve becomes in the discharging state, and a state where the actual shift ratio is substantially kept at the minimum shift ratio continues for a predetermined period of time or more, the shift controller determines that the upshift control actuator is kept in the filling state.

2. The diagnostic device for a shift control actuator according to claim 1, wherein, when the shift controller instructs the upshift control actuator so that the upshift control valve becomes in the filling state, and an event where the actual shift ratio increases is detected a predetermined number of times or more, the shift controller determines that the downshift control actuator is kept in the discharging state.

3. The diagnostic device for a shift control actuator according to claim 2, wherein the upshift control actuator has a function to change steplessly or in a plurality of steps a filling speed of the hydraulic fluid to the chamber according to an increase in a controlled variable thereof, and wherein the shift controller determines that the downshift control actuator is kept in the discharging state, only when the controlled variable of the upshift control actuator is a predetermined value or above.

4. The diagnostic device for a shift control actuator according to claim 1, wherein the downshift control actuator has a function to change steplessly or in a plurality of steps a discharging speed of the hydraulic fluid from the chamber according to an increase in a controlled variable thereof, and wherein the shift controller determines that the upshift control actuator is kept in the filling state, only when the controlled variable of the downshift control actuator is a predetermined value or above.

5. The diagnostic device for a shift control actuator according to claim 1, wherein, when the shift controller instructs a duty ratio above a predetermined value to the upshift control actuator but the upshift is not performed, the shift controller determines that the upshift control actuator is kept in the non-filling state.

6. A diagnostic device for a shift control actuator of a continuously variable transmission, comprising:
   a variator for steplessly changing a shift ratio from a predetermined maximum shift ratio to a predetermined minimum shift ratio;
   a chamber for decreasing the shift ratio of the variator by being filled with hydraulic fluid, and increasing the shift ratio of the variator by discharging the hydraulic fluid;
   an upshift control valve that switches between a filling state where the hydraulic fluid supplied from an oil pump is filled into the chamber and a non-filling state where the filling of the hydraulic fluid into the chamber is suspended, to decrease the shift ratio of the variator;
   a downshift control valve that switches between a discharging state where the hydraulic fluid is discharged from the chamber and a non-discharging state where the discharge of the hydraulic fluid from the chamber is suspended, to increase the shift ratio of the variator;
   a fail-safe valve for suspending the discharge of the hydraulic fluid from the chamber when the upshift control valve is in the filling state regardless of the state of the downshift control valve, and permitting the downshift control valve to discharge the hydraulic fluid when the upshift control valve is in the non-filling state;
   an upshift control actuator for driving the upshift control valve to switch between the filling state and the non-filling state;
   a downshift control actuator for driving the downshift control valve to switch between the discharging state and the non-discharging state;
   an actual shift ratio detector for detecting an actual shift ratio of the variator; and
   a shift controller for controlling the upshift control actuator and the downshift control actuator so that the actual shift ratio approaches the target shift ratio,
   wherein, when the shift controller instructs the upshift control actuator so that the upshift control valve becomes in the filling state, and when an event where the actual shift ratio increases is detected a predetermined number of times or more, the shift controller determines that the downshift control actuator is kept in the discharging state.

7. The diagnostic device for a shift control actuator according to claim 6, wherein the upshift control actuator has a function to change steplessly or in a plurality of steps a filling speed of the hydraulic fluid to the chamber according to an increase in a controlled variable thereof, and
   wherein the shift controller determines that the downshift control actuator is kept in the discharging state, only when the controlled variable of the upshift control actuator is a predetermined value or above.

8. The diagnostic device for a shift control actuator according to claim 6, wherein the predetermined number of times is at least two times.

9. The diagnostic device for a shift control actuator according to claim 6, wherein the predetermined number of times occur within a predetermined period of time.

10. The diagnostic device for a shift control actuator according to claim 6, wherein, when the down controller instructs a duty ratio above a predetermined value to the downshift control actuator but the downshift is not performed, the shift controller determines that the downshift control actuator is kept in the non-discharging state.

* * * * *